US012142182B2

(12) United States Patent
Kim et al.

(10) Patent No.: US 12,142,182 B2
(45) Date of Patent: Nov. 12, 2024

(54) DISPLAY DEVICE AND DRIVING METHOD OF DISPLAY DEVICE

(71) Applicant: Samsung Display Co., Ltd., Yongin-si (KR)

(72) Inventors: Tae Young Kim, Seongnam-si (KR); Jongwoo Park, Seongnam-si (KR); Yoonho Kim, Anyang-si (KR); Ja Eun Lee, Suwon-si (KR); Daeyoun Cho, Yongin-si (KR); Yoonsuk Choi, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/085,207

(22) Filed: Dec. 20, 2022

(65) Prior Publication Data

US 2023/0215328 A1 Jul. 6, 2023

(30) Foreign Application Priority Data

Jan. 4, 2022 (KR) ........................ 10-2022-0000875

(51) Int. Cl.
*G09G 3/20* (2006.01)
*G09G 3/3233* (2016.01)

(52) U.S. Cl.
CPC ......... *G09G 3/2074* (2013.01); *G09G 3/2003* (2013.01); *G09G 3/3233* (2013.01); *G09G 2300/0452* (2013.01); *G09G 2310/027* (2013.01)

(58) Field of Classification Search
CPC ..... G09G 2300/0452; G09G 2310/027; G09G 2320/0242; G09G 3/2003; G09G 3/2074; G09G 3/3225; G09G 3/3233
See application file for complete search history.

(56) References Cited

U.S. PATENT DOCUMENTS

| | | | |
|---|---|---|---|
| 8,159,644 | B2 | 4/2012 | Takatori |
| 8,810,567 | B2 | 8/2014 | Niloka et al. |
| 10,147,770 | B2 | 12/2018 | Zhang et al. |

(Continued)

FOREIGN PATENT DOCUMENTS

| | | | |
|---|---|---|---|
| CN | 104617125 | B * | 1/2018 |
| JP | 6372710 | B2 | 8/2018 |

(Continued)

*Primary Examiner* — Kenneth Bukowski

(74) *Attorney, Agent, or Firm* — Lewis Roca Rothgerber Christie LLP

(57) ABSTRACT

A display device, includes: a display panel; and a driving unit configured to receive image data, analyze the image data, and determine shapes of a plurality of pixel units making up the image, wherein the plurality of pixel units include a first pixel unit including a plurality of first sub-pixels or a second pixel unit including a plurality of second sub-pixels and having a shape different from a shape of the first pixel unit, and wherein the first sub-pixels and the second sub-pixels include a 1-1st color sub-pixel configured to emit a first color, a 1-2nd color sub-pixel configured to emit the first color, a second color sub-pixel configured to emit a second color, the second color being different from the first color, and a third color sub-pixel configured to emit a third color, the third color being different from the first color and the second color.

19 Claims, 15 Drawing Sheets

(56) References Cited

U.S. PATENT DOCUMENTS

| | | | | |
|---|---|---|---|---|
| 10,700,136 | B2 * | 6/2020 | Qiu | H10K 59/352 |
| 10,950,666 | B2 * | 3/2021 | Zhou | H10K 59/35 |
| 2005/0041188 | A1 * | 2/2005 | Yamazaki | G09G 3/3607 349/146 |
| 2011/0025723 | A1 * | 2/2011 | Kim | H10K 59/353 257/89 |
| 2017/0024895 | A1 * | 1/2017 | Kasai | G01N 21/57 |
| 2017/0132969 | A1 * | 5/2017 | Guo | H10K 59/353 |
| 2019/0058017 | A1 * | 2/2019 | Du | H10K 59/00 |
| 2020/0328259 | A1 * | 10/2020 | Joe | H10K 71/166 |

FOREIGN PATENT DOCUMENTS

| | | | |
|---|---|---|---|
| KR | 10-2011-0013691 | A | 2/2011 |
| KR | 10-2012-0056361 | A | 6/2012 |
| KR | 10-1269330 | B1 | 5/2013 |
| KR | 10-2017-0097828 | A | 8/2017 |
| KR | 10-1865215 | B1 | 6/2018 |
| KR | 10-1877158 | B1 | 7/2018 |

* cited by examiner

DISPLAY DEVICE AND DRIVING METHOD OF DISPLAY DEVICE

CROSS-REFERENCE TO RELATED APPLICATIONS

The present application claims priority to and the benefit of Korean Patent Application No. 10-2022-0000875 filed on Jan. 4, 2022, in the Korean Intellectual Property Office, the entire disclosure of which is incorporated herein by reference.

BACKGROUND

Aspects of some embodiments of the present disclosure described herein relate to a display device with relatively improved image quality and a driving method thereof.

A display panel may include a pixel for implementing an image. The pixel may include a red sub-pixel, a blue sub-pixel, and a green sub-pixel. The display panel may display a color image and a black and white image by turning on/off a red sub-pixel, a blue sub-pixel, and a green sub-pixel making up one pixel.

The above information disclosed in this background section is only for enhancement of understanding of the background and therefore the information discussed in this background section does not necessarily constitute prior art.

SUMMARY

Aspects of some embodiments of the present disclosure include a display device with relatively improved image quality and a driving method of the display device.

According to some embodiments, a display device may include a display panel that displays an image and a driving unit that receives image data, analyzes the image data, and determines shapes of a plurality of pixel units making up the image. According to some embodiments, the plurality of pixel units may include at least one of a first pixel unit including a plurality of first sub-pixels or a second pixel unit including a plurality of second sub-pixels and having a shape different from a shape of the first pixel unit. According to some embodiments, each of the plurality of first sub-pixels and the plurality of second sub-pixels may include a 1-1st color sub-pixel emitting a first color of light, a 1-2nd color sub-pixel emitting the first color of light, a second color sub-pixel emitting a second color of light, the second color being different from the first color, and a third color sub-pixel emitting a third color of light, the third color being different from the first color and the second color.

According to some embodiments, a first outline surrounding the first pixel unit may include a 1-1st outer portion extending along a first direction and a 1-2nd outer portion extending along a second direction crossing the first direction. According to some embodiments, a second outline surrounding the second pixel unit may include a 2-1st outer portion extending along a first cross direction crossing the first direction and the second direction.

According to some embodiments, the second outline may further include a 2-2nd outer portion extending along the second direction.

According to some embodiments, the second outline may further include a 2-3rd outer portion extending along a second cross direction crossing the first cross direction and being connected with the 2-1st outer portion and the 2-2nd outer portion.

According to some embodiments, the second outline may further include a 2-2nd outer portion extending along the second cross direction crossing the first cross direction.

According to some embodiments, the first color may be a green color, the second color may be a red color, and the third color may be a blue color.

According to some embodiments, each of light emitting areas of the 1-1st color sub-pixel, the 1-2nd color sub-pixel, the second color sub-pixel, and the third color sub-pixel may have a triangular shape.

According to some embodiments, each of light emitting areas of the 1-1st color sub-pixel and the 1-2nd color sub-pixel may have a triangular shape. According to some embodiments, each of light emitting areas of the second color sub-pixel and the third color sub-pixel may have a trapezoidal shape.

According to some embodiments, each of light emitting areas of the 1-1st color sub-pixel, the 1-2nd color sub-pixel, the second color sub-pixel, and the third color sub-pixel may have a trapezoidal shape.

According to some embodiments, the first pixel unit may be provided in plural. The plurality of first pixel units may include a 1-1st pixel unit and a 1-2nd pixel unit adjacent to the 1-1st pixel unit in the first direction. According to some embodiments, a first light emitting layer of the 1-2nd color sub-pixel of the 1-1st pixel unit may be connected with a second light emitting layer of the 1-1st color sub-pixel of the 1-2nd pixel unit to be provided integrally.

According to some embodiments, each of the 1-1st color sub-pixel, the 1-2nd color sub-pixel, the second color sub-pixel, and the third color sub-pixel may be provided in plural. According to some embodiments, the plurality of 1-1st color sub-pixels and the plurality of 1-2nd color sub-pixels may be alternately and repeated arranged one by one along the first direction. According to some embodiments, the plurality of second color sub-pixels may be arranged along the first direction. According to some embodiments, the plurality of third color sub-pixels may be arranged along the first direction.

According to some embodiments, the driving unit may include a black and white image converter that converts an image corresponding to the image data into a black and white image, a contour extractor that extracts a contour of the black and white image, a component analyzer that analyzes a direction component of the contour, a determination unit that determines the shapes of the plurality of pixel units based on the direction component, and a data generator that renders the image data to correspond to the determined shapes of the plurality of pixel units to generate display data.

According to some embodiments, the display panel may be divided into a plurality of blocks. According to some embodiments, the determination unit may determine the shapes of the plurality of pixel units in units of the plurality of blocks.

According to some embodiments, the determination unit may determine each of the shapes of the plurality of pixel units.

According to some embodiments, a driving method of a display device may include receiving image data, converting an image corresponding to the image data into a black and white image, extracting a contour of the black and white image, analyzing a direction component of the contour, determining shapes of a plurality of pixel units based on the direction component, and rendering the image data to correspond to the determined shapes of the plurality of pixel units to generate display data. According to some embodiments, each of the plurality of pixel units may include a 1-1st color sub-pixel emitting a first color of light, a 1-2nd color sub-pixel emitting the first color of light, a second color sub-pixel emitting a second color of light, the second color being different from the first color, and a third color sub-pixel emitting a third color of light, the third color being different from the first color and the second color.

According to some embodiments, the shapes of the plurality of pixel units may be determined as a shape of a first pixel unit surrounded by a first outline or a shape of a second pixel unit surrounded by a second outline having a shape different from a shape of the first outline.

According to some embodiments, the first outline surrounding the first pixel unit may include a 1-1st outer portion extending along a first direction and a 1-2nd outer portion extending along a second direction crossing the first direction. According to some embodiments, the second outline surrounding the second pixel unit may include a 2-1st outer portion extending along a first cross direction crossing the first direction and the second direction.

According to some embodiments, the first outline may have a quadrangular shape, and the second outline may have a parallelogram shape, a quadrangular shape, or a triangular shape.

According to some embodiments, a display panel may be divided into a plurality of blocks. According to some embodiments, the determining of the shapes of the plurality of pixel units may include determining the shapes of the plurality of pixel units in units of the plurality of blocks. According to some embodiments, shapes of some pixel units making up one of the plurality of blocks may be the same as each other.

According to some embodiments, the determining of the shapes of the plurality of pixel units may include determining each of the shapes of the plurality of pixel units.

BRIEF DESCRIPTION OF THE FIGURES

The above and other aspects and characteristics of embodiments according to the present disclosure will become more apparent by describing in more detail embodiments thereof with reference to the accompanying drawings.

DETAILED DESCRIPTION

Figure 1:
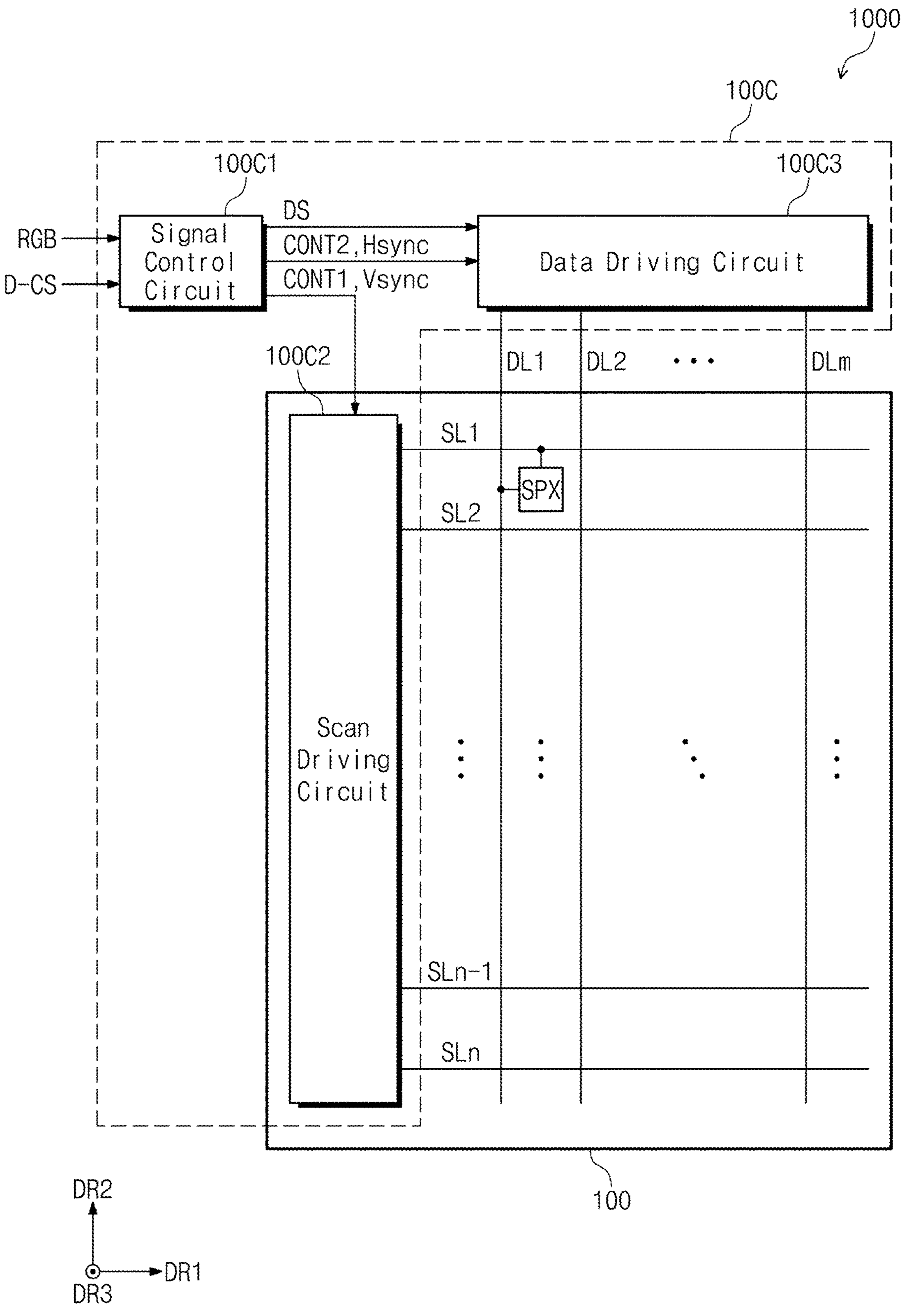
FIG. 1 is a block diagram of a display device according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in the drawings, the thicknesses, the ratios, and the dimensions of the components may be exaggerated for effective description of technical contents. The expression "and/or" includes one or more combinations which associated components are capable of defining.

Although the terms "first," "second," etc. may be used herein in describing various components, such components should not be construed as being limited by these terms. These terms are only used to distinguish one component from another component. For example, a first component could be termed a second component without departing from the scope of the claims of the present disclosure, and similarly a second component could be termed a first component. The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, components, parts, or a combination thereof but do not preclude the presence or addition of one or more other features, numbers, steps, operations, components, parts, or a combination thereof.

The term "part" or "unit" refers to a software component or a hardware component for performing a specific function. The hardware component may include, for example, a field-programmable gate array (FPGA) or an application-specific integrated circuit (ASIC). The software component may refer to data used by an executable code and/or an executable code in an addressable storage medium. Thus, the software components may be, for example, object-oriented software component, class component, and task component and may include processes, functions, attributes, procedures, subroutines, program code segments, drivers, firmware, microcode, circuits, data, databases, data structures, tables, arrays, or variables.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device 1000 according to some embodiments of the present disclosure.

Referring to FIG. 1, the display device 1000 may include a display panel 100 and a driving unit 100C for driving the display panel 100.

The display panel 100 may include a plurality of scan lines SL1-SLn, a plurality of data lines DL1-DLm, and a plurality of sub-pixels SPX. Each of the plurality of sub-pixels SPX may be connected with a corresponding data line among the plurality of data lines DL1-DLm and may be connected with a corresponding scan line among the plurality of scan lines SL1-SLn. According to some embodiments of the present disclosure, the display panel 100 may further include light emitting control lines, and the driving unit 100C may further include a light emitting driving circuit which provides control signals to the light emitting control lines. The configuration of the display panel 100 is not particularly limited.

Each of the plurality of scan lines SL1-SLn may extend along a first direction DR1, and the plurality of scan lines SL1-SLn may be arranged spaced apart from each other in a second direction DR2. Each of the plurality of data lines DL1-DLm may extend along the second direction DR2, and the plurality of data lines DL1-DLm may be arranged spaced apart from each other in the first direction DR1.

The driving unit 100C may include a signal control circuit 100C1, a scan driving circuit 100C2, and a data driving circuit 100C3.

The signal control circuit 100C1 may receive image data RGB and a control signal D-CS from a main driving unit. The control signal D-CS may include various signals. For example, the control signal D-CS may include an input vertical synchronization signal, an input horizontal synchronization signal, a main clock, and a data enable signal.

The signal control circuit 100C1 may receive the image data RGB, may analyze the image data RGB, and may determine shapes of a plurality of pixel units making up an image. Thus, the signal control circuit 100C1 may convert the image data RGB into display data. A detailed description of the signal control circuit 100C1 will be described in more detail below.

The signal control circuit 100C1 may generate a first control signal CONT1 and a vertical synchronization signal Vsync based on the control signal D-CS and may output the first control signal CONT1 and the vertical synchronization signal Vsync to the scan driving circuit 100C2.

The signal control circuit 100C1 may generate a second control signal CONT2 and a horizontal synchronization signal Hsync based on the control signal D-CS and may output the second control signal CONT2 and the horizontal synchronization signal Hsync to the data driving circuit 100C3.

Furthermore, the signal control circuit 100C1 may output a driving signal DS, which is obtained by processing the image data RGB to suit an operation condition of the display panel 100, to the data driving circuit 100C3. The first control signal CONT1 and the second control signal CONT2 may be signals to enable operations of the scan driving circuit 100C2 and the data driving circuit 100C3, which are not specifically limited.

The scan driving circuit 100C2 may drive the plurality of scan lines SL1-SLn in response to the first control signal CONT1 and the vertical synchronization signal Vsync. According to some embodiments of the present disclosure, the scan driving circuit 100C2 may be formed in the same process as a circuit layer 120 (refer to FIG. 3A) in the display panel 100, but not limited thereto. For example, the scan driving circuit 100C2 may be implemented as an integrated circuit (IC), which may be directly mounted on a certain area of the display panel 100 or may be mounted on a separate printed circuit board in a chip on film (COF) manner to be electrically connected with the display panel 100.

The data driving circuit 100C3 may output a gray scale voltage to the plurality of data lines DL1-DLm in response to the second control signal CONT2, the horizontal synchronization signal Hsync, and the driving signal DS from the signal control circuit 100C1. The data driving circuit 100C3 may be implemented as an IC and may be directly mounted on a certain area of the display panel 100 or may be mounted on a separate printed circuit board in the COF manner to be electrically connected with the display panel 100, but not limited thereto. For example, the data driving circuit 100C3 may be formed in the same process as the circuit layer 120 (refer to FIG. 3A) in the display panel 100.

Figure 2A:
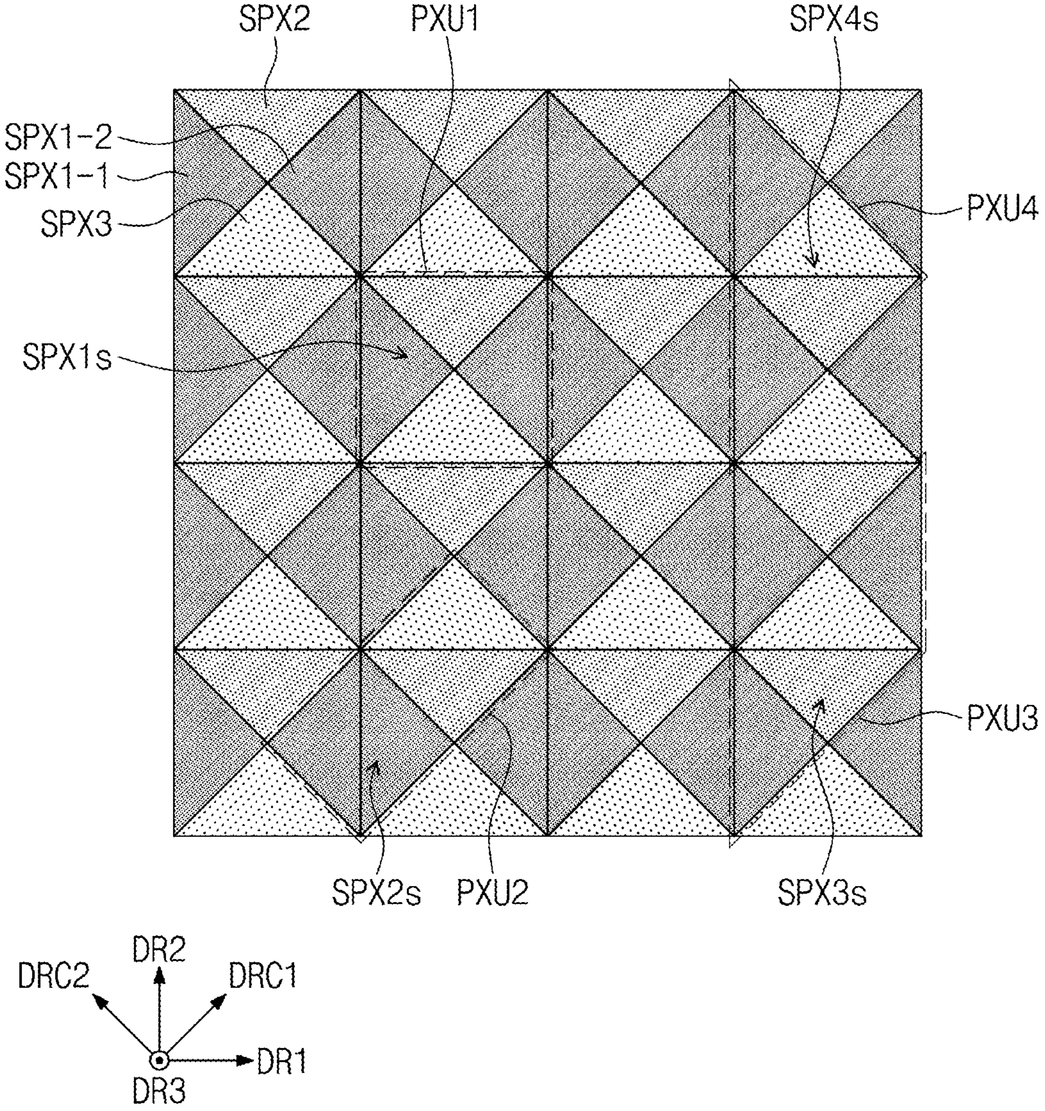
FIG. 2A is a plan view illustrating a pixel array according to some embodiments of the present disclosure.

FIG. 2A is a plan view illustrating a pixel array according to some embodiments of the present disclosure.

Referring to FIGS. 1 and 2A, a plurality of sub-pixels SPX may include first color sub-pixels SPX1-1 and SPX1-2, a second color sub-pixel SPX2, and a third color sub-pixel SPX3. The first color sub-pixels SPX1-1 and SPX1-2 may emit a first color of light. The second sub-pixel SPX2 may emit a second color of light, which is different from the first color. The third color sub-pixel SPX3 may emit a third color of light, which is different from the first color and the second color. The first color sub-pixels SPX1-1 and SPX1-2 may include the 1-1st color sub-pixel SPX1-1 and the 1-2nd color sub-pixel SPX1-2.

The first color may be a green color, the second color may be a red color, and the third color may be a blue color, but not particularly limited thereto. For example, the first color may be the red color, the second color may be the green color, and the third color may be the blue color. The first color may be the blue color, the second color may be the red color, and the third color may be the green color.

The 1-1st color sub-pixel SPX1-1 and the 1-2nd color sub-pixel SPX1-2 may be alternately arranged one by one along a first direction DR1. The second color sub-pixel SPX2 may be provided in plural and may be arranged along the first direction DR1. The third color sub-pixel SPX3 may be provided in plural and may be arranged along the first direction DR1. The second color sub-pixel SPX2 and the third color sub-pixel SPX3 may be alternately repeated and arranged along the second direction DR2.

Only sub-pixels, each of which provides the same color, may be connected with each of a plurality of scan lines SL1-SLn. For example, only the second color sub-pixels SPX2 may be connected with the first scan line SL1, only the 1-1st color sub-pixel SPX1-1 and the 1-2nd color sub-pixel SPX1-2 may be connected with the second scan line SL2, and only the third color sub-pixels SPX3 may be connected with the nth scan line SLn.

The plurality of sub-pixels SPX may make up a first pixel unit PXU1 and the second pixel units PXU2, PXU3, and PXU4. Each of the first pixel unit PXU1 and the second pixel units PXU2, PXU3, and PXU4 may refer to a unit making up an image. The second pixel units PXU2, PXU3, and PXU4 may be pixel units, each of which has a different shape from a shape of the first pixel unit PXU1. Hereinafter, for convenience of description, the second pixel units PXU2, PXU3, and PXU4 may be referred to as the second pixel unit PXU2, the third pixel unit PXU3, and the fourth pixel unit PXU4.

The first pixel unit PXU1 may include first sub-pixels SPX1*s*. The second pixel unit PXU2 may include second sub-pixels SPX2*s*. The third pixel unit PXU3 may include third sub-pixels SPX3*s*. The fourth pixel unit PXU4 may include fourth sub-pixels SPX4*s*. Each of the first sub-pixels SPX1*s*, the second sub-pixels SPX2*s*, the third sub-pixels SPX3*s*, and the fourth sub-pixels SPX4*s* may include the 1-1st color sub-pixel SPX1-1, the 1-2nd color sub-pixel SPX1-2, the second color sub-pixel SPX2, and the third color sub-pixel SPX3.

Figure 2B:
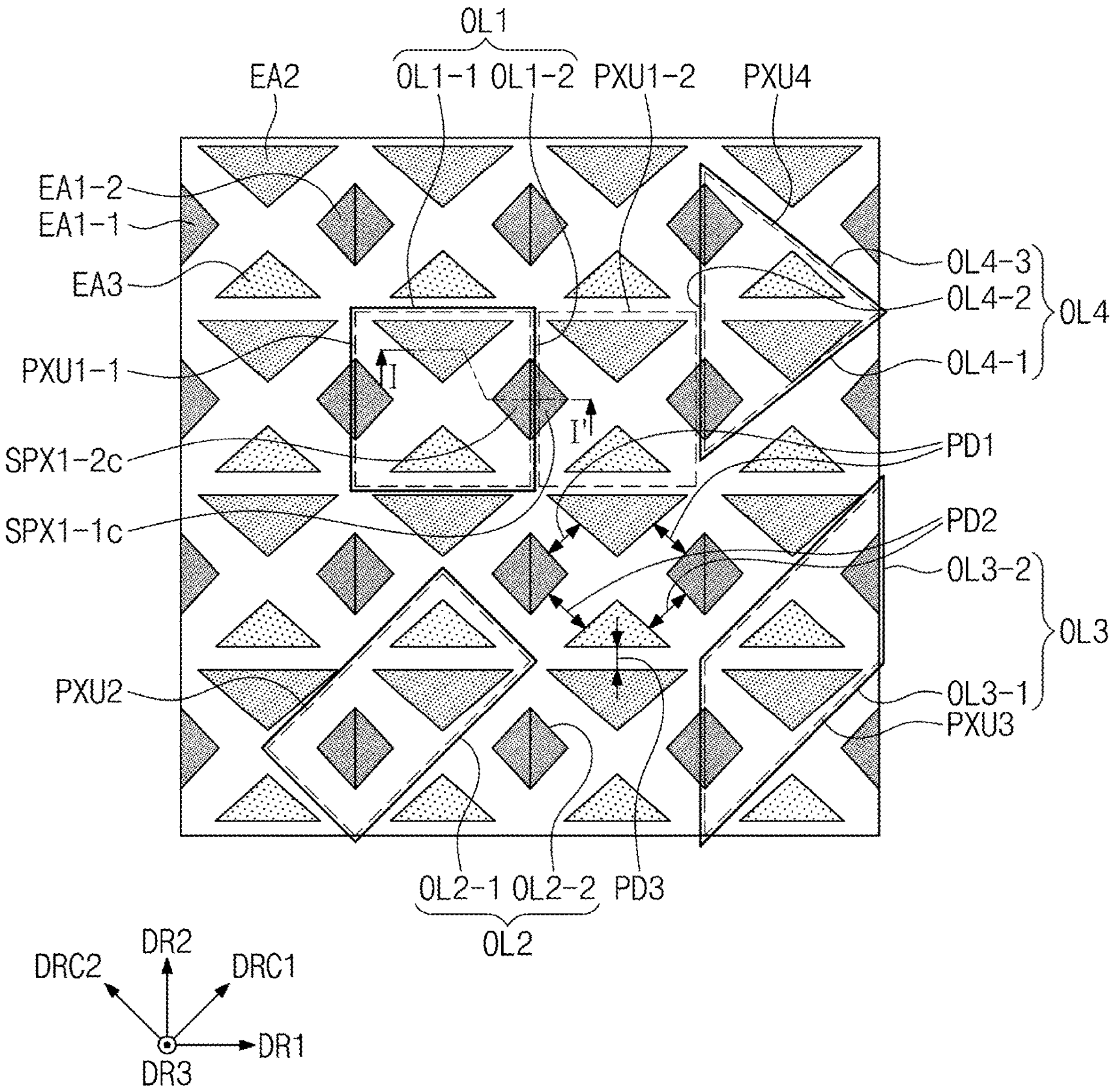
FIG. 2B is a plan view illustrating a pixel array according to some embodiments of the present disclosure.

FIG. 2B is a plan view illustrating a pixel array according to some embodiments of the present disclosure.

Referring to FIGS. 2A and 2B, a 1-1st light emitting area EA1-1 and a 1-2nd light emitting area EA1-2 respectively corresponding to a 1-1st color sub-pixel SPX1-1 and a 1-2nd color sub-pixel SPX1-2, a second light emitting area EA2 corresponding to a second color sub-pixel SPX2, and a third light emitting area EA3 corresponding to a third color sub-pixel SPX3 are illustrated. Each of the 1-1st light emitting area EA1-1, the 1-2nd light emitting area EA1-2, the second light emitting area EA2, and the third light emitting area EA3 may be a triangular shape.

The 1-1st light emitting area EA1-1 and the 1-2nd light emitting area EA1-2 may be substantially the same in area as each other. The second light emitting area EA2 may be larger in area than the 1-1st light emitting area EA1-1. The third light emitting area EA3 may be larger in area than the second light emitting area EA2.

The sum of the area of the 1-1st light emitting area EA1-1 and the area of the 1-2nd light emitting area EA1-2 may be larger in area than the second light emitting area EA2 and may be smaller in area than the third light emitting area EA3. For example, the ratio of the area of the 1-1st light emitting area EA1-1: the area of the 1-2nd light emitting area EA1-2: the area of the second light emitting area EA2: the area of the third light emitting area EA3 may be 1.5:1.5:2:4.

The 1-1st light emitting area EA1-1 and the 1-2nd light emitting area EA1-2 may provide the same color. Thus, it is safe not to apply a gap for preventing or reducing color mixture between the 1-1st light emitting area EA1-1 and the 1-2nd light emitting area EA1-2. A certain gap PD1 may be provided between the second light emitting area EA2 and the 1-1st light emitting area EA1-1 and between the second light emitting area EA2 and the 1-2nd light emitting area EA1-2. A certain gap PD2 may be provided between the third light emitting area EA3 and the 1-1st light emitting area EA1-1 and between the third light emitting area EA3 and the 1-2nd light emitting area EA1-2. Furthermore, a certain gap PD3 may be provided between the second light emitting area EA2 and the third light emitting area EA3. Each of the gaps PD1, PD2, and PD3 may be greater than or equal to 15 micrometers. However, the numerical value is only one example. When the numerical value is a level where color mixture is prevented or reduced, it may be variously applied.

A first outline OL1 surrounding a first pixel unit PXU1, a second outline OL2 surrounding a second pixel unit PXU2, a third outline OL3 surrounding a third pixel unit PXU3, and a fourth outline OL4 surrounding a fourth pixel unit PXU4 are illustrated as an example. Each of the first to fourth outlines OL1, OL2, OL3, and OL4 may be composed of straight lines. For example, the first to fourth outlines OL1, OL2, OL3, and OL4 may be composed of a minimum number of straight lines respectively surrounding the first to fourth pixel units PXU1, PXU2, PXU3, and PXU4.

The first outline OL1 may include a 1-1st outer portion OL1-1 extending along a first direction DR1 and a 1-2nd outer portion OL1-2 extending along a second direction DR2. Thus, the first pixel unit PXU1 may enable expressing a horizontal line parallel to the first direction DR1 or a horizontal line parallel to the second direction DR2.

The second outline OL2 may include a 2-1st outer portion OL2-1 extending along a first cross direction DRC1 crossing the first direction DR1 and the second direction DR2 and a 2-2nd outer portion OL2-2 extending along a second cross direction DRC2 crossing the first cross direction DRC1. Thus, the second pixel unit PXU2 may enable expressing a diagonal line.

The third outline OL3 may include a 3-1st outer portion OL3-1 extending along the first cross direction DRC1 and a 3-2nd outer portion OL3-2 extending along the second direction DR2. Thus, the third pixel unit PXU3 may enable expressing a vertical line and a diagonal line.

The fourth outline OL4 may include a 4-1st outer portion OL4-1 extending along the first cross direction DRC1, a 4-2nd outer portion OL4-2 extending along the second direction DR2, and a 4-3rd outer portion OL4-3 extending along the second cross direction DRC2. Thus, the fourth pixel unit PXU4 may enable expressing a vertical line and a diagonal line.

The first to fourth pixel units PXU1 to PXU4 and the first to fourth outlines OL1 to OL4 respectively corresponding to the first to fourth pixel units PXU1 to PXU4 are illustrated as an example in FIGS. 2A and 2B, but the shape of the pixel unit may be variously provided. For example, when including one 1-1st color sub-pixel SPX1-1, one 1-2nd color sub-pixel SPX1-2, one second color sub-pixel SPX2, and one third color sub-pixel SPX3, which are described above, one pixel unit may be provided in various forms.

According to some embodiments of the present disclosure, each of shapes of the plurality of pixel units may be determined by analyzing image data. For example, when displaying Korean and English which mainly use vertical and horizontal lines, the plurality of pixel units may be mainly determined as shapes of the first pixel unit PXU1. Alternatively, when displaying characters such as Chinese characters where a diagonal expression is relatively important, the plurality of pixel units may enable diagonal expression like the second to fourth pixel units PXU2 to PXU4. In this case, recognition image quality recognized by a user who uses a display device 1000 (refer to FIG. 1) may be improved without an increase in resolution.

Figure 3A:
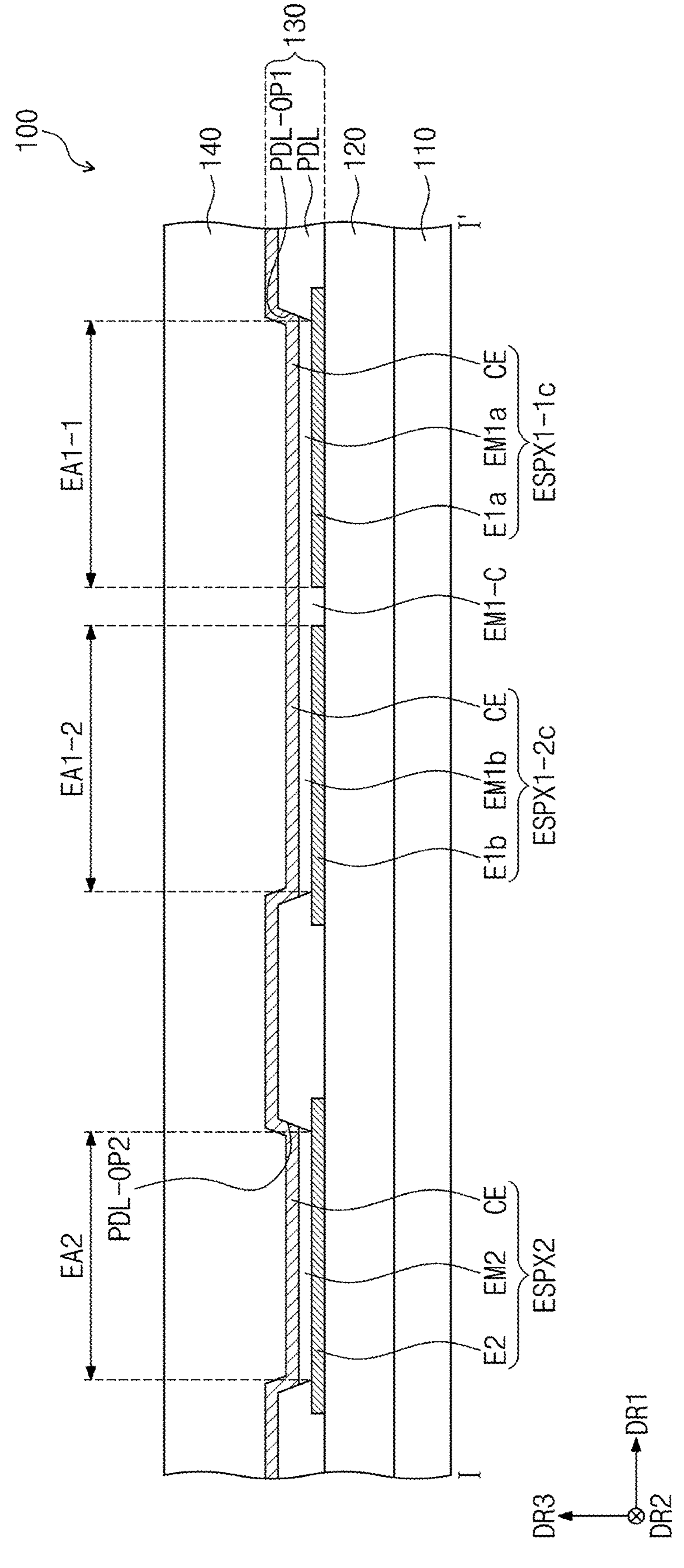
FIG. 3A is a cross-sectional view according to some embodiments of the present disclosure, which is cut along the line I-I' shown in FIG. 2B.

FIG. 3A is a cross-sectional view according to some embodiments of the present disclosure, which is cut along the line I-I' shown in FIG. 2B.

Referring to FIGS. 2A, 2B, and 3A, a display panel 100 may include a base layer 110, a circuit layer 120, a light emitting element layer 130, and an encapsulation layer 140.

The base layer 110 may be a member which provides a base surface on which the circuit layer 120 is located. The base layer 110 may be a rigid substrate, or a flexible substrate allowing bending, folding, or rolling. The base layer 110 may be a glass substrate, a metal substrate, a polymer substrate, or the like. However, the embodiments are not limited thereto, but the base layer 110 may be an inorganic layer, an organic layer, or a composite material layer.

The circuit layer 120 may be located on the base layer 110. The circuit layer 120 may include an insulating layer, a semiconductor pattern, a conductive pattern, a signal line, and the like. An insulating layer, a semiconductor layer, and a conductive layer may be formed on the base layer 110 in a scheme such as coating or deposition and may then be selectively patterned through a plurality of photolithography processes. Thereafter, the semiconductor pattern, the conductive pattern, and the signal line included in the circuit layer 120 may be formed.

The light emitting element layer 130 may be located on the circuit layer 120. The light emitting element layer 130 may include light emitting elements ESPX1-1*c*, ESPX1-2*c*, and ESPX2. The 1-1st light emitting element ESPX1-1*c* may be included in a 1-1st color sub-pixel SPX1-1*c*. The 1-2nd light emitting element ESPX1-2*c* may be included in a 1-2nd color sub-pixel SPX1-2*c*. The second light emitting element ESPX2 may be included in a second color sub-pixel SPX2.

The 1-1st light emitting element ESPX1-1*c* may include a 1-1st pixel electrode E1*a*, a 1-1st light emitting layer EM1*a*, and a common electrode CE. The 1-2nd light emitting element ESPX1-2*c* may include a 1-2nd pixel electrode E1*b*, a 1-2nd light emitting layer EM1*b*, and a common electrode CE. The second light emitting element ESPX2 may include a second pixel electrode E2, a second light emitting layer EM2, and a common electrode CE.

A plurality of first pixel units PXU1 may include a 1-1st pixel unit PXU1-1 and a 1-2nd pixel unit PXU1-2 adjacent to the 1-1st pixel unit PXU1-1 in a first direction DR1. The 1-2nd light emitting element ESPX1-2*c* of the 1-1st pixel unit PXU1-1 may be adjacent to the 1-1st light emitting element ESPX1-1*c* of the 1-2nd pixel unit PXU1-2. The 1-1st light emitting layer EM1*a* of the 1-1st color sub-pixel SPX1-1*c* and the 1-2nd light emitting layer EM1*b* of the 1-2nd color sub-pixel SPX1-2*c* may be connected with each other to be provided integrally. For example, the 1-1st light emitting layer EM1*a* may be defined as a portion overlapping the 1-1st pixel electrode E1*a*, the 1-2nd light emitting layer EM1*b* may be defined as a portion overlapping the 1-2nd pixel electrode E1*b*, and a connection light emitting layer EM1-C may be located between the 1-1st light emitting layer EM1*a* and the 1-2nd light emitting layer EM1*b*.

According to some embodiments of the present disclosure, the 1-2nd light emitting layer EM1*b* of the 1-2nd light emitting element ESPX1-2*c* and the 1-1st light emitting layer EM1*a* of the 1-1st light emitting element ESPX1-1*c*, which are adjacent to each other to emit the same color, may be connected with each other without being separated from each other to be deposited. Thus, one connected light emitting pattern EM1*a*, EM1*b*, and EM1-C may overlap a plurality of pixel electrodes, for example, the 1-1st pixel electrode E1*a* and the 1-2nd pixel electrode E1*b*. Although sub-pixels making up one pixel unit are subdivided, a process difficulty level may not be increased.

The pixel definition layer PDL may be located on the circuit layer 120 and may cover at least a portion of each of the 1-1st pixel electrode E1*a*, the 1-2nd pixel electrode E1*b*, and the second pixel electrode E2. A plurality of openings PDL-OP1 and PDL-OP2 may be defined in the pixel definition layer PDL. For example, the first opening PDL-OP1 may expose a portion of each of the 1-1st pixel electrode E1*a* and the 1-2nd pixel electrode E1*b*. The second opening PDL-OP2 may expose a portion of the second pixel electrode E2.

A 1-1st light emitting area EA1-1 and a 1-2nd light emitting area EA1-2 may overlap the first opening PDL-OP1. For example, the 1-1st light emitting area EA1-1 may be defined to correspond to a partial area of the 1-1st pixel electrode E1*a*, which is exposed by the first opening PDL-OP1, and the 1-2nd light emitting area EA1-2 may be defined to correspond to a partial area of the 1-2nd pixel electrode E1*b*, which is exposed by the first opening PDL-OP1 The second light emitting area EA2 may be defined to correspond to a partial area of the second pixel electrode E2, which is exposed by the second opening PDL-OP2.

The common electrode CE may be located on the light emitting layers EM1*a*, EM1*b*, EM1-C, and EM2. The common electrode CE may be arranged in common in a plurality of pixels. According to some embodiments, a hole control layer may be located between the pixel electrodes E1*a*, E1*b*, and E2 and the light emitting layers EM1*a*, EM1*b*, EM1-C, and EM2. The hole control layer may include a hole transport layer and may further include a hole injection layer. An electron control layer may be located between the light emitting layers EM1*a*, EM1*b*, EM1-C, and EM2 and the common electrode CE. The electron control layer may include an electron transport layer and may further include an electron injection layer. The hole control layer and the electron control layer may be formed in common in the plurality of pixels using an open mask.

The encapsulation layer 140 may be located on the light emitting element layer 130. The encapsulation layer 140 may include an inorganic layer, an organic layer, and an inorganic layer sequentially laminated, and layers making up the encapsulation layer 140 are not limited thereto. The inorganic layers may protect the light emitting element layer 130 from moisture and oxygen, and the organic layer may protect the light emitting element layer 130 from a foreign material such as dust particles.

Figure 3B:
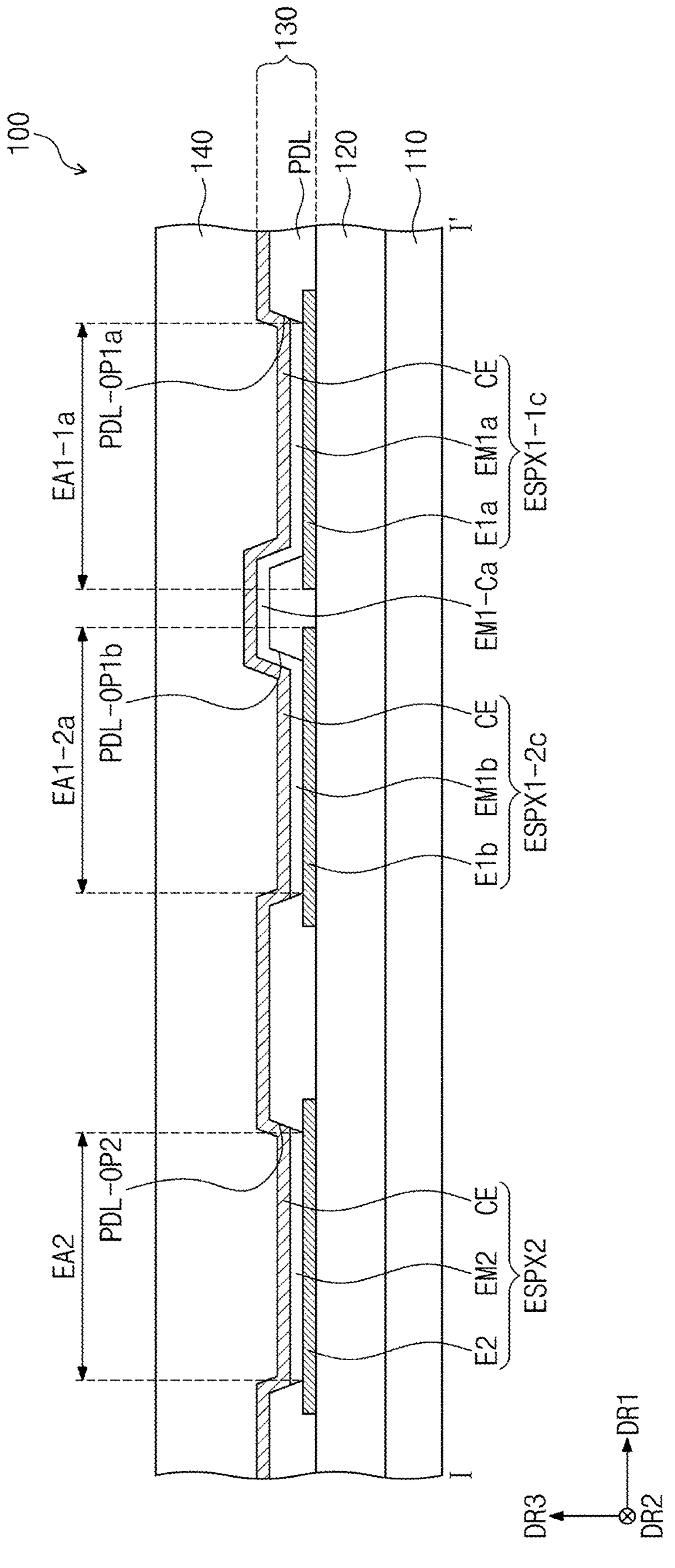
FIG. 3B is a cross-sectional view according to some embodiments of the present disclosure, which is cut along the line I-I' shown in FIG. 2B.

FIG. 3B is a cross-sectional view according to some embodiments of the present disclosure, which is cut along the line I-I' shown in FIG. 2B. In describing FIG. 3B, a description will be given of only a part having a difference with FIG. 3A.

Referring to FIG. 3B, a pixel definition layer PDLa may be located on a circuit layer 120 and may cover a portion of each of a 1-1st pixel electrode E1*a*, a 1-2nd pixel electrode E1*b*, and a second pixel electrode E2. A plurality of openings PDL-OP1*a*, PDL-OP1*b*, and PDL-OP2 may be defined in the pixel definition layer PDLa. For example, the 1-1st opening PDL-OP1*a* may expose a portion of the 1-1st pixel electrode E1*a*, and the 1-2nd opening PDL-OP1*b* may expose a portion of the 1-2nd pixel electrode E1*b*. The second opening PDL-OP2 may expose a portion of the second pixel electrode E2.

A 1-1st light emitting area EA1-1*a* may be defined to correspond to a partial area of the 1-1st pixel electrode E1*a*, which is exposed by the first opening PDL-OP1*a*, and a 1-2nd light emitting area EA1-2*a* may be defined to correspond to a partial area of the 1-2nd pixel electrode E1*b*, which is exposed by the 1-2nd opening PDL-OP1*b*. The second light emitting area EA2 may be defined to correspond to a partial area of the second pixel electrode E2, which is exposed by the second opening PDL-OP2.

A connection light emitting layer EM1-Ca connected with a 1-1st light emitting layer EM1*a* and a 1-2nd light emitting layer EM1*b* may be located on a portion of the pixel definition layer PDLa between the 1-1st opening PDL-OP1*a* and the 1-2nd opening PDL-OP1*b*.

According to some embodiments of the present disclosure, one connected light emitting pattern EM1*a*, EM1*b*, and EM1-Ca may overlap a plurality of pixel electrodes, for example, the 1-1st pixel electrode E1*a* and the 1-2nd pixel electrode E1*b*. Although sub-pixels making up one pixel unit are subdivided, a process difficulty level may not be increased.

Figure 4:
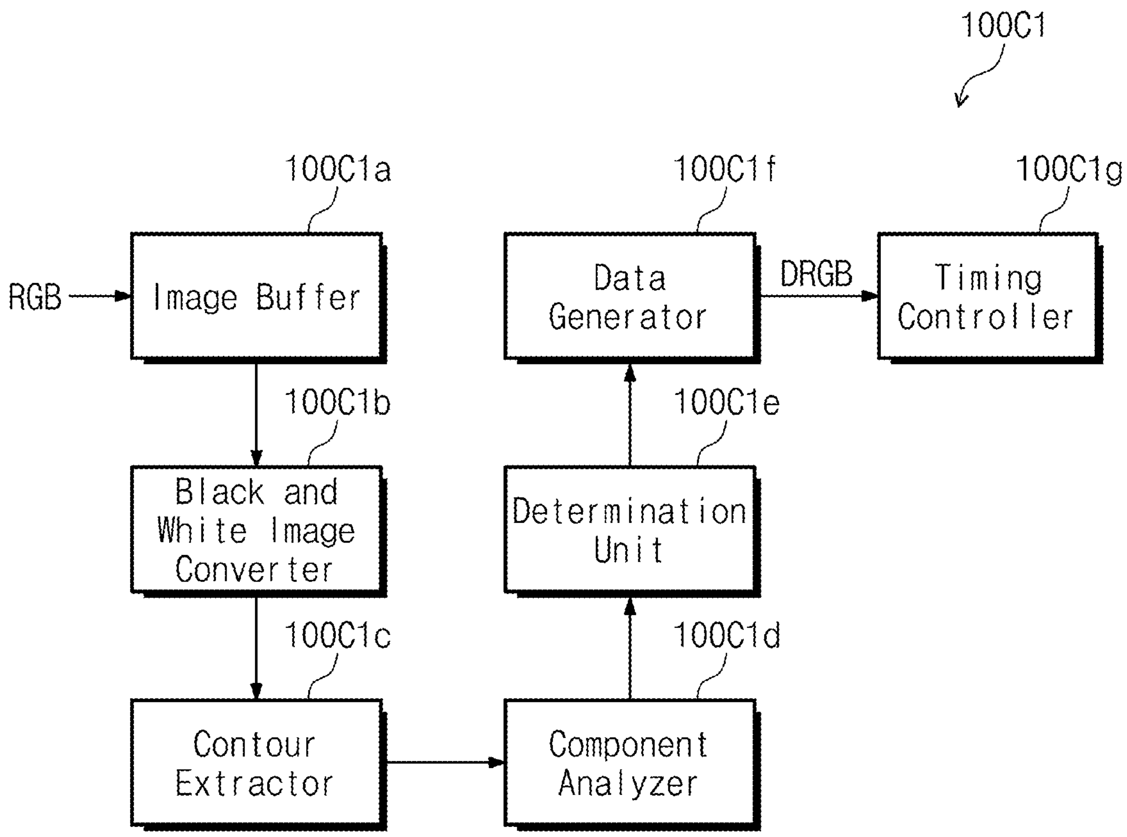
FIG. 4 is a block diagram of a signal control circuit according to some embodiments of the present disclosure.
Figure 5A:
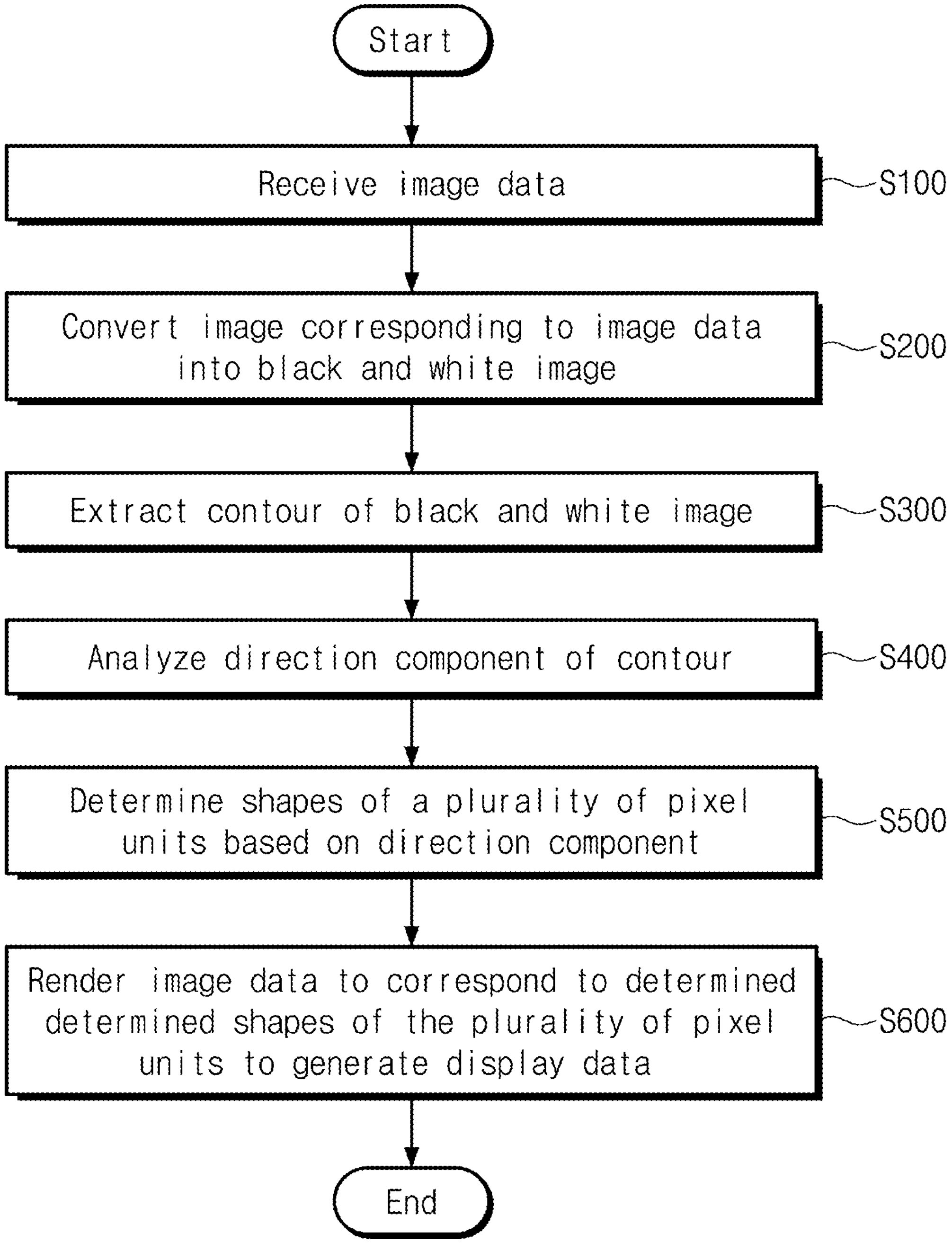
FIG. 5A is a flowchart of a driving method of a display device according to some embodiments of the present disclosure.
Figure 5B:
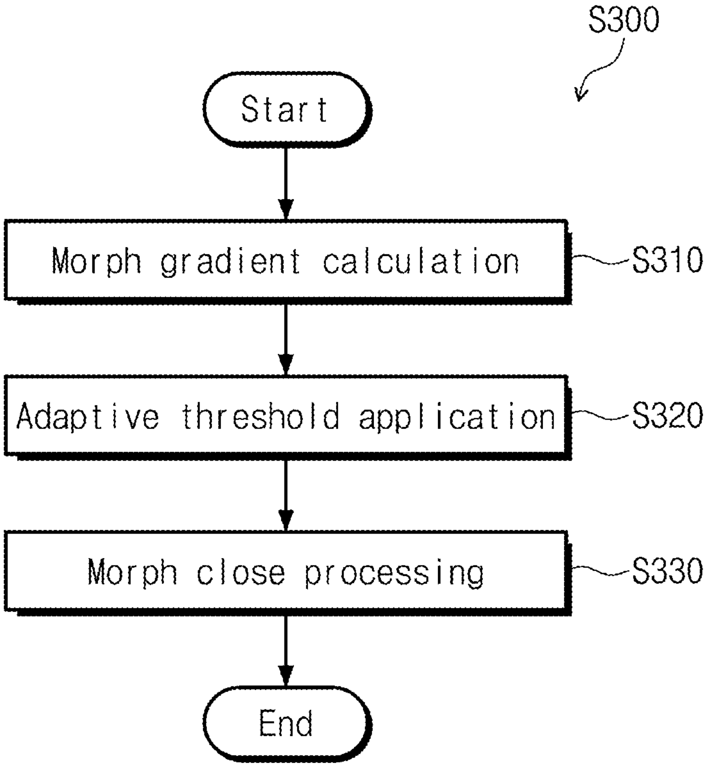
FIG. 5B is a flowchart of an image processing method according to some embodiments of the present disclosure.

FIG. 4 is a block diagram of a signal control circuit according to some embodiments of the present disclosure. FIG. 5A is a flowchart of a driving method of a display device according to some embodiments of the present disclosure. FIG. 5B is a flowchart of an image processing method according to some embodiments of the present disclosure.

Referring to FIGS. 1, 4, 5A, and 5B, a signal control circuit 100C1 may include an image buffer 100C1*a*, a black and white image converter 100C1*b*, a contour extractor 100C1*c*, a component analyzer 100C1*d*, a determination unit 100C1*e*, a data generator 100C1*f*, and a timing controller 100C1*g*. The image buffer 100C1*a*, the white and black image converter 100C1*b*, the contour extractor 100C1*c*, the component analyzer 100C1*d*, the determination unit 100C1*e*, the data generator 100C1*f*, and the timing controller 100C1*g* do not refer to separate components which are divided physically. For example, the image buffer 100C1*a*, the white and black image converter 100C1*b*, the contour extractor 100C1*c*, the component analyzer 100C1*d*, the determination unit 100C1*e*, the data generator 100C1*f*, and the timing controller 100C1*g* are divided functionally according to their operations, which may be implemented in a single chip.

In operation S100, the signal control circuit 100C1 may receive image data RGB. One frame of image data RGB may be stored in the image buffer 100C1*a*. The signal control circuit 100C1 may analyze an image using the image buffer 100C1*a* and may select pixel driving according to the analyzed result.

In operation S200, the black and white image converter 100C1*b* may convert an image corresponding to the image data RGB into a black and white image.

In operation S300, the contour extractor 100C1*c* may extract a contour of the black and white image. The operation of extracting the contour may be to extract the contour (or an outline) through morph gradient calculation (S310), adaptive threshold application (S320), and morph close processing (S330).

In operation S400, the component analyzer 100C1*d* may analyze a direction component of the contour. In operation S500, the determination unit 100C1*e* may determine shapes of a plurality of pixel units based on the direction component.

In operation S600, the data generator 100C1*f* may render the image data RGB to correspond to the determined shapes of the plurality of pixel units to generate display data DRGB. The data generator 100C1*f* may provide the timing controller 100C1*g* with the display data DRGB.

Figure 6A:
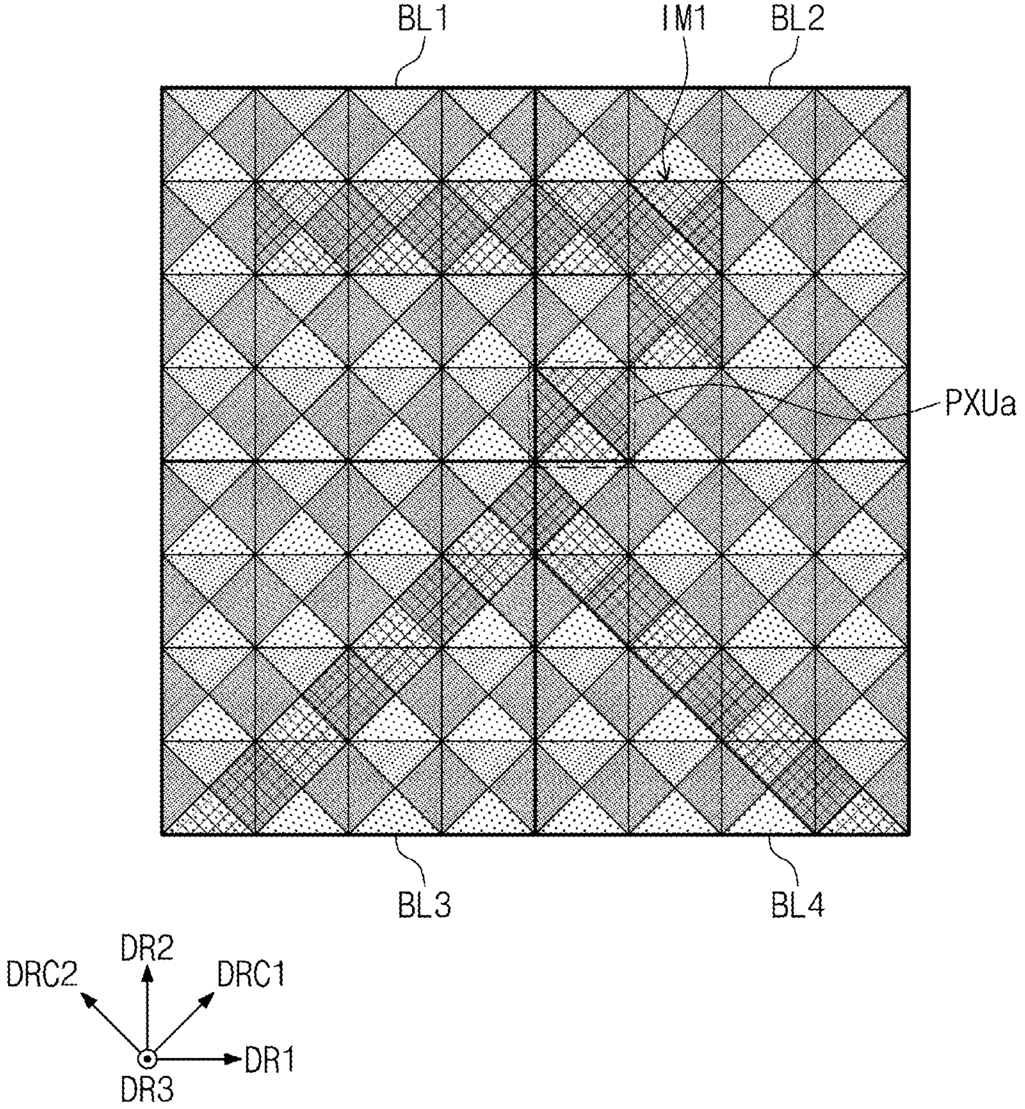
FIG. 6A is a drawing illustrating an image implemented by a plurality of pixel units according to some embodiments of the present disclosure.
Figure 6B:
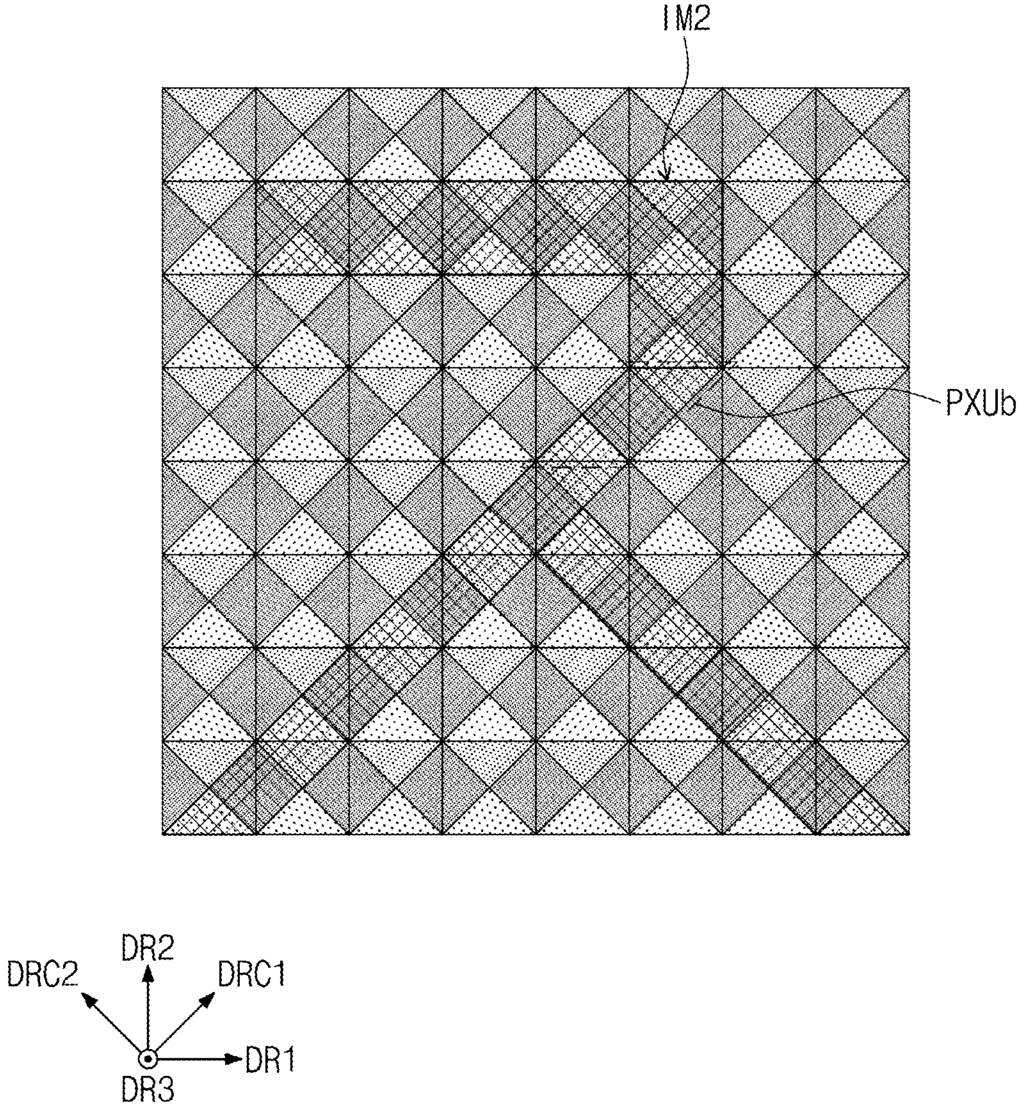
FIG. 6B is a drawing illustrating an image implemented by a plurality of pixel units according to some embodiments of the present disclosure.

FIG. 6A is a drawing illustrating an image implemented by a plurality of pixel units according to some embodiments of the present disclosure. FIG. 6B is a drawing illustrating an image implemented by a plurality of pixel units according to some embodiments of the present disclosure.

Referring to FIGS. 6A and 6B, first and second images IM1 and IM2 displaying the same character are illustrated. In FIGS. 6A and 6B, the first and second images IM1 and IM2 are displayed using mesh lines parallel to a first cross direction DRC1 and a second cross direction DRC2. The first image IM1 may be composed of a plurality of pixel units, and the second image IM2 may be composed of a plurality of pixel units.

Referring to FIGS. 4 and 6A, a display panel 100 (refer to FIG. 1) may be divided into a plurality of blocks BL1, BL2, BL3, and BL4. The four blocks BL1, BL2, BL3, and BL4 are illustrated as an example in FIG. 6A. Each of the blocks BL1, BL2, BL3, and BL4 are exemplified as being composed of 3×3 with respect to a shape of a first pixel unit, but not particularly limited thereto. For example, each of the blocks BL1, BL2, BL3, and BL4 may be variously modified as 10×10 or 100×100 with respect to the shape of the first pixel unit.

A determination unit 100C1*e* may determine shapes of a plurality of pixel units in units of the plurality of blocks BL1, BL2, BL3, and BL4. For example, shapes of pixel units included in the second block BL2 may be the same as each other.

Referring to FIGS. 4 and 6B, the determination unit 100C1*e* may determine each of the shapes of the plurality of pixel units. For example, although displaying the same image, a second comparison pixel unit PXUb shown in FIG. 6B may be different in shape from a first comparison pixel unit PXUa shown in FIG. 6A. For example, an outline of a character to be displayed by the second comparison pixel unit PXUb may be more clearly displayed.

When the shapes of the pixel units are determined for each block unit like FIG. 6A, as the amount of calculation is reduced, a calculation speed may be improved. Furthermore, because the shape of the pixel unit suitable for each block unit is determined, actual recognition image quality may be improved.

When each of shapes is determined for each pixel unit like FIG. 6B, as the amount of calculation is increased, a speed may be relatively reduced. However, because shapes are determined for each pixel unit, actual recognition image quality may be more improved than when the shapes are determined for each block unit.

Figure 7A:
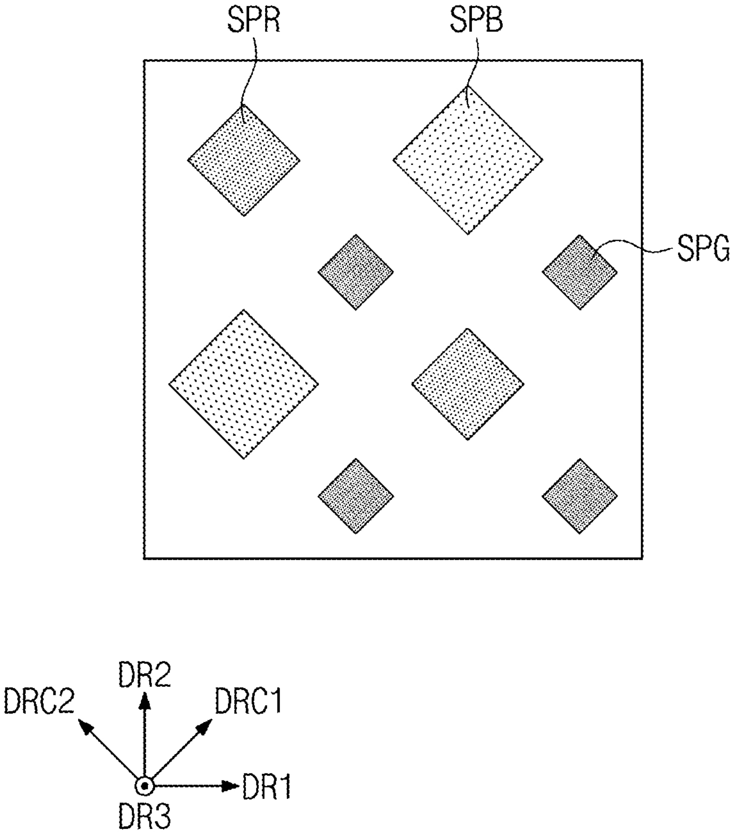
FIG. 7A is a plan view illustrating an array of sub-pixels.
Figure 7B:
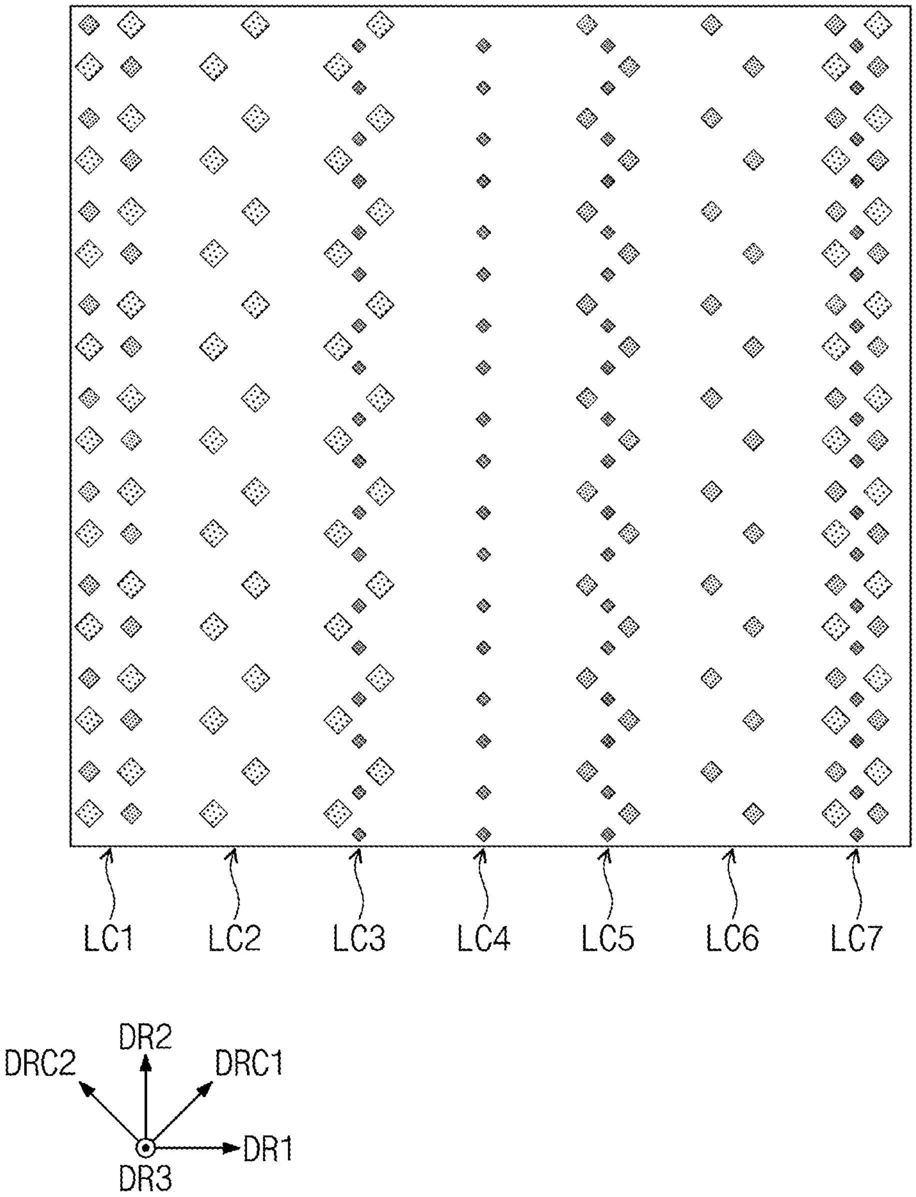
FIG. 7B is a drawing illustrating certain line images using an array of sub-pixels.

FIG. 7A is a plan view illustrating an array of sub-pixels according to a comparison embodiment of the present disclosure. FIG. 7B is a drawing illustrating certain line images using an array of sub-pixels according to a comparison embodiment.

Referring to FIG. 7A, each of a first color sub-pixel SPG, a second color sub-pixel SPR, and a third color sub-pixel SPB may have a diamond shape. The first color sub-pixel SPG may be a green sub-pixel, the second color sub-pixel SPR may be a red sub-pixel, and the third color sub-pixel SPB may be a blue sub-pixel. An array of sub-pixels shown in FIG. 7A may be repeated in a first direction DR1 and a second direction DR2.

The second color sub-pixel SPR and the third color sub-pixel SPB may be alternately repeated and arranged along the first direction DR1 and the second direction DR2. The first color sub-pixel SPG and the second color sub-pixel SPR may be alternately repeated and arranged along a first cross direction DRC1 and a second cross direction DRC2. The first color sub-pixel SPG and the third color sub-pixel SPB may be alternately repeated and arranged along the first cross direction DRC1 and the second cross direction DRC2.

Seven line images LC1, LC2, LC3, LC4, LC5, LC6, and LC7 are illustrated in FIG. 7B. The first line image LC1 may be an image composed of the second color sub-pixels SPR and the third color sub-pixels SPB. The second line image LC2 may be an image composed of the third color sub-pixels SPB. The third line image LC3 may be an image composed of the first color sub-pixels SPG and the third color sub-pixels SPB. The fourth line image LC4 may be an image composed of the first color sub-pixels SPG. The fifth line image LC5 may be an image composed of the first color sub-pixels SPG and the second color sub-pixels SPR. The sixth line image LC6 may be an image composed of the second color sub-pixels SPR. The seventh line image LC7 may be an image composed of the first color sub-pixels SPG, the second color sub-pixels SPR, and the third color sub-pixels SPB.

Figure 8:
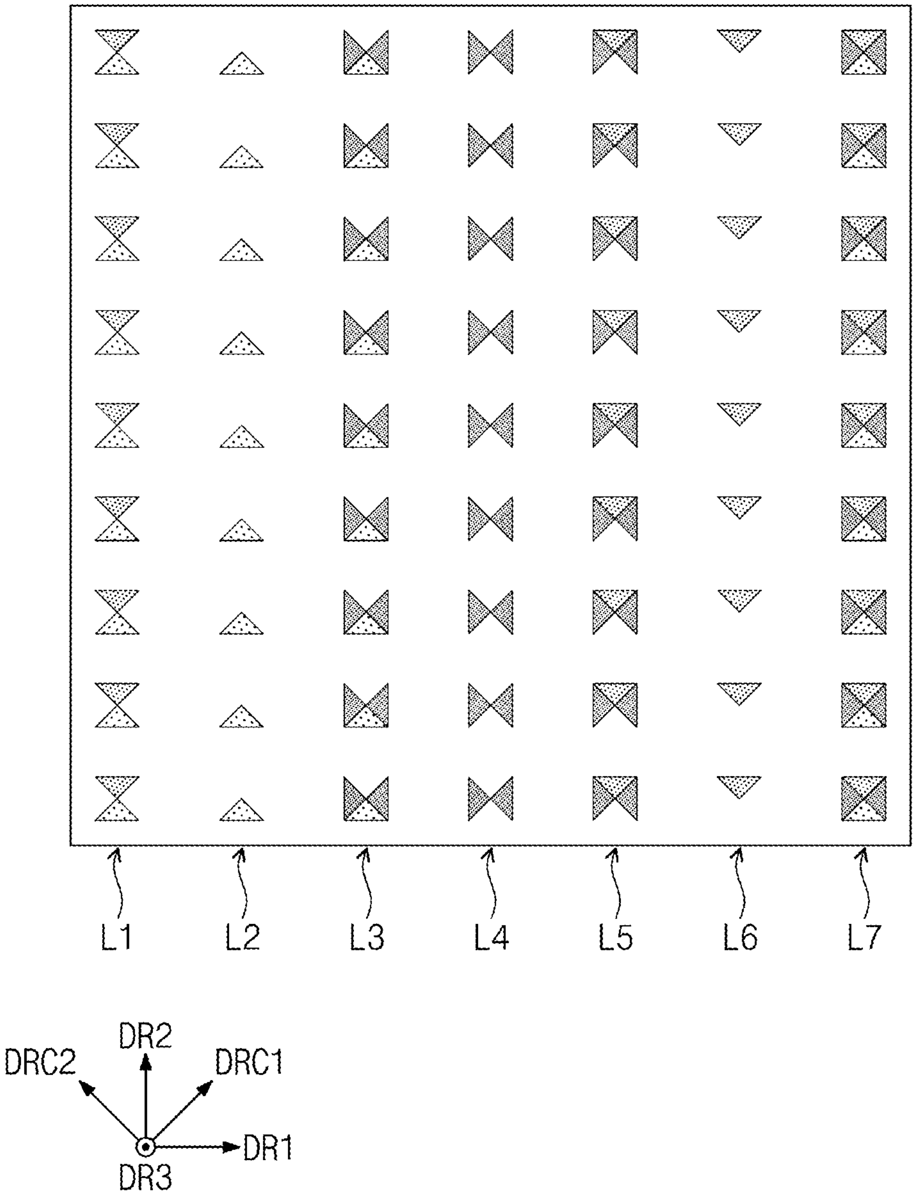
FIG. 8 is a drawing illustrating certain line images using an array of sub-pixels according to some embodiments of the present disclosure.

FIG. 8 is a drawing illustrating certain line images using an array of sub-pixels according to some embodiments of the present disclosure.

Referring to FIGS. 2A and 8, seven line images L1, L2, L3, L4, L5, L6, and L7 are illustrated. The seven line images L1, L2, L3, L4, L5, L6, and L7 may be images displayed using sub-pixels shown in FIG. 2A.

The first line image L1 may be an image composed of second color sub-pixels SPX2 and third color sub-pixels SPX3. The second line image L2 may be an image composed of third color sub-pixels SPX3. The third line image L3 may be an image composed of 1-1st color sub-pixels SPX1-1, 1-2nd color sub-pixels SPX1-2, and the third color sub-pixels SPX3. The fourth line image L4 may be an image composed of the 1-1st color sub-pixels SPX1-1 and the 1-2nd color sub-pixels SPX1-2. The fifth line image L5 may be an image composed of the 1-1st color sub-pixels SPX1-1, the 1-2nd color sub-pixels SPX1-2, and the second color sub-pixels SPX2. The sixth line image L6 may be an image composed of the second color sub-pixels SPX2. The seventh line image L7 may be an image composed of the 1-1st color sub-pixels SPX1-1, the 1-2nd color sub-pixels SPX1-2, the second color sub-pixels SPX2, and the third color sub-pixels SPX3.

When comparing FIG. 7B with FIG. 8, in case of a pixel array according to some embodiments of the present disclosure, quality of expression of the straight line may be more improved. Furthermore, because sub-pixels displaying a line image are arranged adjacent to each other, a color shift phenomenon may be reduced. Thus, display quality may be improved.

Figure 9:
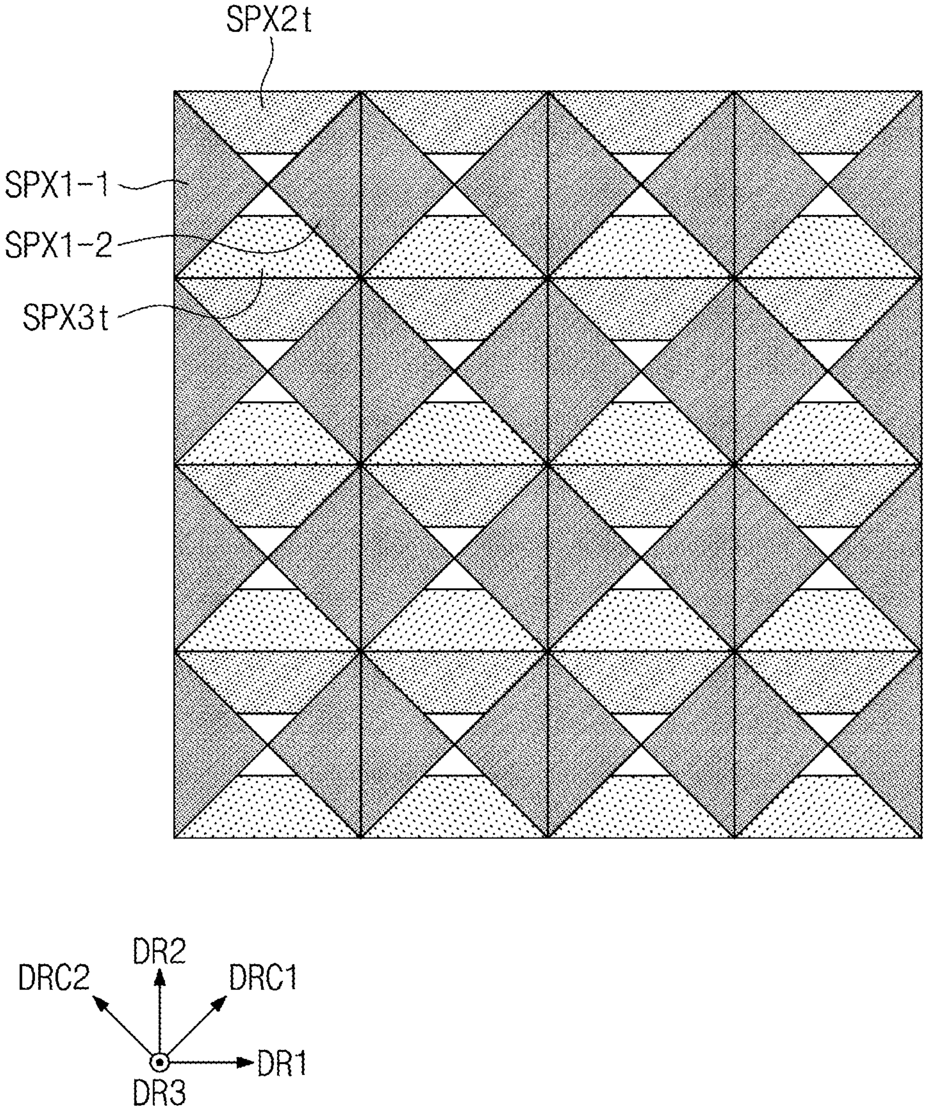
FIG. 9 is a plan view illustrating a pixel array according to some embodiments of the present disclosure.

FIG. 9 is a plan view illustrating a pixel array according to some embodiments of the present disclosure.

Referring to FIG. 9, a plurality of sub-pixels SPX (refer to FIG. 1) may include first color sub-pixels SPX1-1 and SPX1-2, a second color sub-pixel SPX2*t*, and a third color sub-pixel SPX3*t*. The first color sub-pixels SPX1-1 and SPX1-2 may emit a first color of light. The second color sub-pixel SPX2*t* may emit a second color of light, which is different from the first color. The third color sub-pixel SPX3*t* may emit a third color of light, which is different from the first color and the second color. The first color sub-pixels SPX1-1 and SPX1-2 may include the 1-1st color sub-pixel SPX1-1 and the 1-2nd color sub-pixel SPX1-2.

Shapes of a 1-1st light emitting area and a 1-2nd light emitting area respectively corresponding to the 1-1st color sub-pixel SPX1-1 and the 1-2nd color sub-pixel SPX1-2 may correspond to a shape shown in FIG. 9. Shapes of a second light emitting area corresponding to the second color sub-pixel SPX2*t* and a third light emitting area corresponding to the third color sub-pixel SPX3*t* may correspond to a shape shown in FIG. 9.

Each of light emitting areas of the 1-1st color sub-pixel SPX1-1 and the 1-2nd color sub-pixel SPX1-2 may have a triangular shape, and each of light emitting areas of the second color sub-pixel SPX2*t* and the third color sub-pixel SPX3*t* may have a trapezoidal shape.

A second color line image extending in a first direction DR1 may be implemented by the second color sub-pixel SPX2*t* having an outline extending along the first direction DR1. A third color line image extending in the first direction DR1 may be implemented by the third color sub-pixel SPX3*t* having an outline extending along the first direction DR1. Furthermore, a mixed color line image extending in the first direction DR1, in which a second color and a third color are mixed, may be implemented by the second color sub-pixel SPX2*t* and the third color sub-pixel SPX3*t*, each of which has an outline extending along the first direction DR1. In other words, when expressing a horizontal line for a specific color, recognition image quality may be more improved by using the second color sub-pixel SPX2*t* or the third color sub-pixel SPX3*t* having the horizontal line.

Furthermore, as each of the second color sub-pixel SPX2*t* and the third color sub-pixel SPX3*t* is provided in the shape of a trapezoid, a gap between two sub-pixels may be more improved and a possibility of mixing two colors may be reduced.

Figure 10:
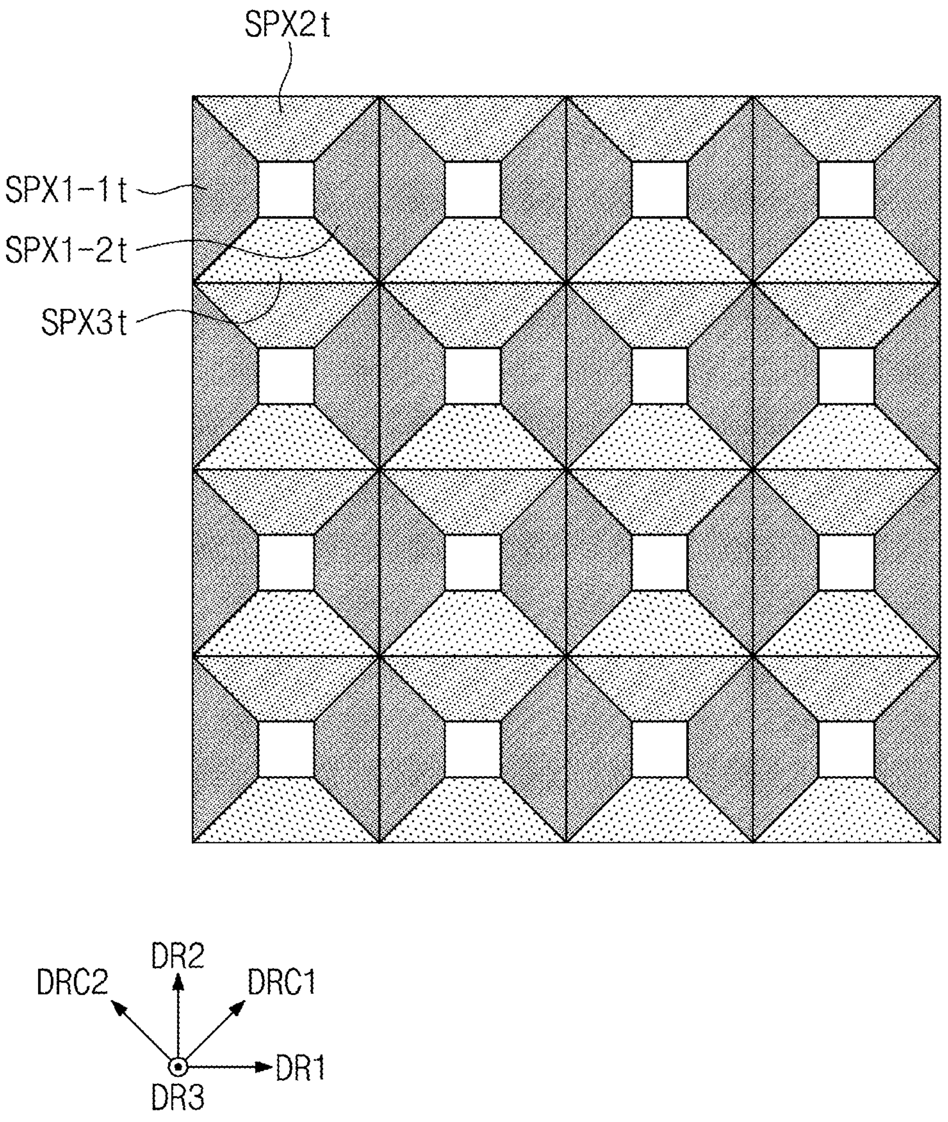
FIG. 10 is a plan view illustrating a pixel array according to some embodiments of the present disclosure.

FIG. 10 is a plan view illustrating a pixel array according to some embodiments of the present disclosure.

Referring to FIG. 10, a plurality of sub-pixels SPX (refer to FIG. 1) may include first color sub-pixels SPX1-1*t* and SPX1-2*t*, a second color sub-pixel SPX2*t*, and a third color sub-pixel SPX3*t*. The first color sub-pixels SPX1-1*t* and SPX1-2*t* may include the 1-1st color sub-pixel SPX1-1*t* and the 1-2nd color sub-pixel SPX1-2*t*.

Shapes of a 1-1st light emitting area and a 1-2nd light emitting area respectively corresponding to the 1-1st color sub-pixel SPX1-1*t* and the 1-2nd color sub-pixel SPX1-2*t* may correspond to a shape shown in FIG. 10. Shapes of a second light emitting area corresponding to the second color sub-pixel SPX2*t* and a third light emitting area corresponding to the third color sub-pixel SPX3*t* may correspond to a shape shown in FIG. 9.

Each of light emitting areas of the 1-1st color sub-pixel SPX1-1*t*, the 1-2nd color sub-pixel SPX1-2*t*, the second color sub-pixel SPX2*t*, and the third color sub-pixel SPX3*t* may have a trapezoidal shape. In other words, each of the light emitting areas may have an outline extending in a first direction DR1 or a second direction DR2. In this case, when expressing a horizontal line or a vertical line for a specific color, recognition image quality may be more improved by using the second color sub-pixel SPX2*t* or the third color sub-pixel SPX3*t* having the horizontal line or the 1-1st color sub-pixel SPX11*t* or the 1-2nd color sub-pixel SPX1-2*t* having the vertical line.

According to some embodiments of the present disclosure, shapes of a plurality of pixel units may be determined by analyzing image data. For example, when an image, vertical and horizontal lines of which are mainly used, is displayed, the plurality of pixel units are determined as a shape in which may enable vertical and/or horizontal expressions. Alternatively, when an image, a diagonal expression of which is mainly used, is displayed, the plurality of pixel units are determined as a shape in which may enable the diagonal expression. In this case, recognition image quality recognized by a user who uses a display device may be relatively improved without an increase in resolution.

While the present disclosure has been described with reference to some embodiments thereof, it will be apparent to those of ordinary skill in the art that various changes and modifications may be made thereto without departing from the spirit and scope of the present disclosure as set forth in the following claims. Accordingly, the technical scope of the present disclosure should not be limited to the contents described in the detailed description of the specification, but should be defined by the appended claims, and their equivalents.

What is claimed is:

1. A display device, comprising:

a display panel configured to display an image; and a driving unit configured to receive image data, analyze the image data, and determine shapes of a plurality of pixel units making up the image, wherein the plurality of pixel units include at least one of a first pixel unit including a plurality of first sub-pixels or a second pixel unit including a plurality of second sub-pixels and having a shape different from a shape of the first pixel unit, and wherein each of the plurality of first sub-pixels and the plurality of second sub-pixels includes a 1-1st color sub-pixel configured to emit a first color of light, a 1-2nd color sub-pixel configured to emit the first color of light, a second color sub-pixel configured to emit a second color of light, the second color being different from the first color, and a third color sub-pixel configured to emit a third color of light, the third color being different from the first color and the second color, wherein each of the 1-1st color sub-pixel, the 1-2nd color sub-pixel, the second color sub-pixel, and the third color sub-pixel is provided in plural, wherein the 1-1st color sub-pixels and the 1-2nd color sub-pixels are alternately and repeatedly arranged one by one along a first direction, and the second color sub-pixels and the third color sub-pixels are alternately and repeatedly arranged one by one along a second direction perpendicular to the first direction, and wherein each of light emitting areas of the 1-1st color sub-pixel and the 1-2nd color sub-pixel has a triangular shape.

2. The display device of claim 1, wherein a first outline surrounding the first pixel unit includes a 1-1st outer portion extending along the first direction and a 1-2nd outer portion extending along the second direction crossing the first direction, and wherein a second outline surrounding the second pixel unit includes a 2-1st outer portion extending along a first cross direction crossing the first direction and the second direction.

3. The display device of claim 2, wherein the second outline further includes a 2-2nd outer portion extending along the second direction.

4. The display device of claim 3, wherein the second outline further includes a 2-3rd outer portion extending along a second cross direction crossing the first cross direction and being connected with the 2-1st outer portion and the 2-2nd outer portion.

5. The display device of claim 2, wherein the second outline further includes a 2-2nd outer portion extending along a second cross direction crossing the first cross direction.

6. The display device of claim 1, wherein the first color is a green color, the second color is a red color, and the third color is a blue color.

7. The display device of claim 1, wherein each of light emitting areas of the second color sub-pixel, and the third color sub-pixel has a triangular shape.

8. The display device of claim 1, wherein each of light emitting areas of the second color sub-pixel and the third color sub-pixel has a trapezoidal shape.

9. The display device of claim 1, wherein the first pixel unit is provided in plural, wherein the plurality of first pixel units include a 1-1st pixel unit and a 1-2nd pixel unit adjacent to the 1-1st pixel unit in the first direction, and wherein a first light emitting layer of the 1-2nd color sub-pixel of the 1-1st pixel unit is connected with a second light emitting layer of the 1-1st color sub-pixel of the 1-2nd pixel unit to be provided integrally.

10. The display device of claim 1, wherein the plurality of second color sub-pixels are arranged along the first direction, and wherein the plurality of third color sub-pixels are arranged along the first direction.

11. The display device of claim 1, wherein the driving unit includes:

a black and white image converter circuit configured to convert an image corresponding to the image data into a black and white image;

a contour extractor circuit configured to extract a contour of the black and white image;

a component analyzer circuit configured to analyze a direction component of the contour;

a determination circuit configured to determine the shapes of the plurality of pixel units based on the direction component; and a data generator circuit configured to render the image data to correspond to the determined shapes of the plurality of pixel units to generate display data.

12. The display device of claim 11, wherein the display panel is divided into a plurality of blocks, and wherein the determination circuit is configured to determine the shapes of the plurality of pixel units in units of the plurality of blocks.

13. The display device of claim 11, wherein the determination circuit is configured to determine each of the shapes of the plurality of pixel units.

14. A driving method of a display device, the driving method comprising:

receiving image data;

converting an image corresponding to the image data into a black and white image;

extracting a contour of the black and white image;

analyzing a direction component of the contour;

determining shapes of a plurality of pixel units based on the direction component; and rendering the image data to correspond to the determined shapes of the plurality of pixel units to generate display data, wherein each of the plurality of pixel units includes a 1-1st color sub-pixel configured to emit a first color of light, a 1-2nd color sub-pixel configured to emit the first color of light, a second color sub-pixel configured to emit a second color of light, the second color being different from the first color, and a third color sub-pixel configured to emit a third color of light, the third color being different from the first color and the second color.

15. The driving method of claim 14, wherein the shapes of the plurality of pixel units are determined as a shape of a first pixel unit surrounded by a first outline or a shape of a second pixel unit surrounded by a second outline having a shape different from a shape of the first outline.

16. The driving method of claim 15, wherein the first outline surrounding the first pixel unit includes a 1-1st outer portion extending along a first direction and a 1-2nd outer portion extending along a second direction crossing the first direction, and wherein the second outline surrounding the second pixel unit includes a 2-1st outer portion extending along a first cross direction crossing the first direction and the second direction.

17. The driving method of claim 15, wherein the first outline has a quadrangular shape, and the second outline has a parallelogram shape, a quadrangular shape, or a triangular shape.

18. The driving method of claim 14, wherein a display panel is divided into a plurality of blocks, and wherein the determining of the shapes of the plurality of pixel units includes:

determining the shapes of the plurality of pixel units in units of the plurality of blocks, and wherein shapes of some pixel units making up one of the plurality of blocks are the same as each other.

19. The driving method of claim 14, wherein the determining of the shapes of the plurality of pixel units includes:

determining each of the shapes of the plurality of pixel units.

* * * * *